United States Patent
Dong et al.

(10) Patent No.: US 11,219,031 B2
(45) Date of Patent: Jan. 4, 2022

(54) APPARATUS AND METHOD FOR RESOURCE MANAGEMENT IN WIRELESS COMMUNICATION SYSTEM

(71) Applicant: Samsung Electronics Co., Ltd., Suwon-si (KR)

(72) Inventors: Jeongsik Dong, Suwon-si (KR); Chungkeun Lee, Suwon-si (KR); Yoonjeong Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 103 days.

(21) Appl. No.: 16/728,279

(22) Filed: Dec. 27, 2019

(65) Prior Publication Data
US 2020/0214016 A1    Jul. 2, 2020

(30) Foreign Application Priority Data
Dec. 28, 2018    (KR) .......................... 10-2018-0172620

(51) Int. Cl.
*H04W 72/08*  (2009.01)
*H04W 72/04*  (2009.01)

(52) U.S. Cl.
CPC ......... *H04W 72/08* (2013.01); *H04W 72/042* (2013.01)

(58) Field of Classification Search
CPC ............................ H04W 72/08; H04W 72/042
See application file for complete search history.

(56) References Cited

U.S. PATENT DOCUMENTS

| | | | |
|---|---|---|---|
| 9,560,660 B1* | 1/2017 | Oroskar | H04L 5/00 |
| 2005/0058097 A1* | 3/2005 | Kang | H04W 72/08 |
| | | | 370/329 |
| 2012/0243431 A1 | 9/2012 | Chen et al. | |
| 2015/0146677 A1* | 5/2015 | Ito | H04W 4/70 |
| | | | 370/329 |
| 2015/0215903 A1* | 7/2015 | Zhao | H04W 72/082 |
| | | | 370/329 |

(Continued)

FOREIGN PATENT DOCUMENTS

WO    2017/171908 A1    10/2017

OTHER PUBLICATIONS

European Search Report dated Apr. 24, 2020; European Appln. No. 19219890.1-1215.

*Primary Examiner* — Rasheed Gidado
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). An apparatus of a base station in such a wireless communication system includes at least one transceiver, and at least one processor operatively coupled to the at least one transceiver, wherein the at least one processor is configured to acquire a channel quality of a first vehicle apparatus, acquire a resource allocation area of the first vehicle apparatus according to the channel quality, and transmit, to the first vehicle apparatus, allocation information relating to a transmission resource determined in the resource allocation area, wherein the transmission resource is used by the first vehicle apparatus to transmit a message to a second vehicle apparatus.

12 Claims, 11 Drawing Sheets

(56) References Cited

U.S. PATENT DOCUMENTS

2017/0188391 A1* 6/2017 Rajagopal ......... H04W 74/0816
2018/0255558 A1* 9/2018 Lee ....................... H04W 76/14
2019/0058981 A1* 2/2019 Xu .......................... H04W 4/06

* cited by examiner

APPARATUS AND METHOD FOR RESOURCE MANAGEMENT IN WIRELESS COMMUNICATION SYSTEM

CROSS-REFERENCE TO RELATED APPLICATION(S)

This application is based on and claims priority under 35 U.S.C. § 119(a) of a Korean patent application number 10-2018-0172620, filed on Dec. 28, 2018, in the Korean Intellectual Property Office, the disclosure of which is incorporated by reference herein in its entirety.

BACKGROUND

1. Field

The disclosure relates to a wireless communication system. More particularly, the disclosure relates to an apparatus and method for resource management in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency-shift keying (FSK) and quadrature amplitude modulation (QAM) Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Various communication services using vehicles are being provided. Messages are defined to smoothly operate communication using a vehicle (hereinafter, vehicle to everything (V2X) communication), such as communication between vehicles, communication between a vehicle and a terminal, or communication between a vehicle and a structure. When resource allocation is independently performed in each base station, a collision between message transmissions of respective vehicles connected to different base stations may occur.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for reducing collisions in message transmission of a vehicle apparatus located at a cell edge in a wireless communication system.

Another aspect of the disclosure is to provide an apparatus and method for resource management for a vehicle apparatus in a wireless communication system.

Another aspect of the disclosure is to provide an apparatus and method for resource allocation by a base station on the basis of a location of a vehicle apparatus in a wireless communication system.

Another aspect of the disclosure is to provide an apparatus and method for resource selection by a terminal on the basis of a location of a vehicle apparatus in a wireless communication system.

Additional aspects will be set forth in part in the description which follows and, in part, will be apparent from the description, or may be learned by practice of the presented embodiments.

In accordance with an aspect of the disclosure, an operation method of a base station in a wireless communication system is provided. The operation method includes acquiring a channel quality of a first vehicle apparatus, acquiring a resource allocation area of the first vehicle apparatus according to the channel quality, and transmitting, to the first vehicle apparatus, allocation information relating to a transmission resource determined in the resource allocation area, wherein the transmission resource is used by the first vehicle apparatus to transmit a message to a second vehicle apparatus.

In accordance with another aspect of the disclosure, an operation method of a first vehicle apparatus in a wireless communication system is provided. The operation method includes performing energy sensing, receiving resource allocation information relating to a transmission resource, determining whether the transmission resource is being used by another node, on the basis of the energy sensing, when the transmission resource is being used by the other node, transmitting a message to a second vehicle apparatus on an available channel acquired by the energy sensing, and when the transmission resource is not being used by the other node, transmitting a message to the second vehicle apparatus on the transmission resource.

In accordance with another aspect of the disclosure, an apparatus of a base station in a wireless communication system is provided. The apparatus includes at least one transceiver, and at least one processor operatively coupled to the at least one transceiver, wherein the at least one processor is configured to acquire a channel quality of a first vehicle apparatus, acquire a resource allocation area of the first vehicle apparatus according to the channel quality, and transmit, to the first vehicle apparatus, allocation information relating to a transmission resource determined in the resource allocation area, wherein the transmission resource is used by the first vehicle apparatus to transmit a message to a second vehicle apparatus.

In accordance with another aspect of the disclosure, a first vehicle apparatus in a wireless communication system is provided. The first vehicle apparatus includes at least one transceiver, and at least one processor operatively coupled to the at least one transceiver, wherein the at least one processor is configured to perform energy sensing, receive resource allocation information relating to a transmission resource, determine whether the transmission resource is being used by another node, on the basis of the energy sensing, when the transmission resource is being used by the other node, transmit a message to a second vehicle apparatus on an available channel acquired by the energy sensing, and when the transmission resource is not being used by the other node, transmit a message to the second vehicle apparatus on the transmission resource.

An apparatus and method according to various embodiments of the disclosure enables avoidance of collisions between message transmissions of vehicle apparatuses connected to different base stations by configuring a dedicated resource area in the base station.

An apparatus and method according to various embodiments of the disclosure enables a message of a vehicle apparatus to be more surely transmitted by sensing a channel allocated to another vehicle apparatus.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
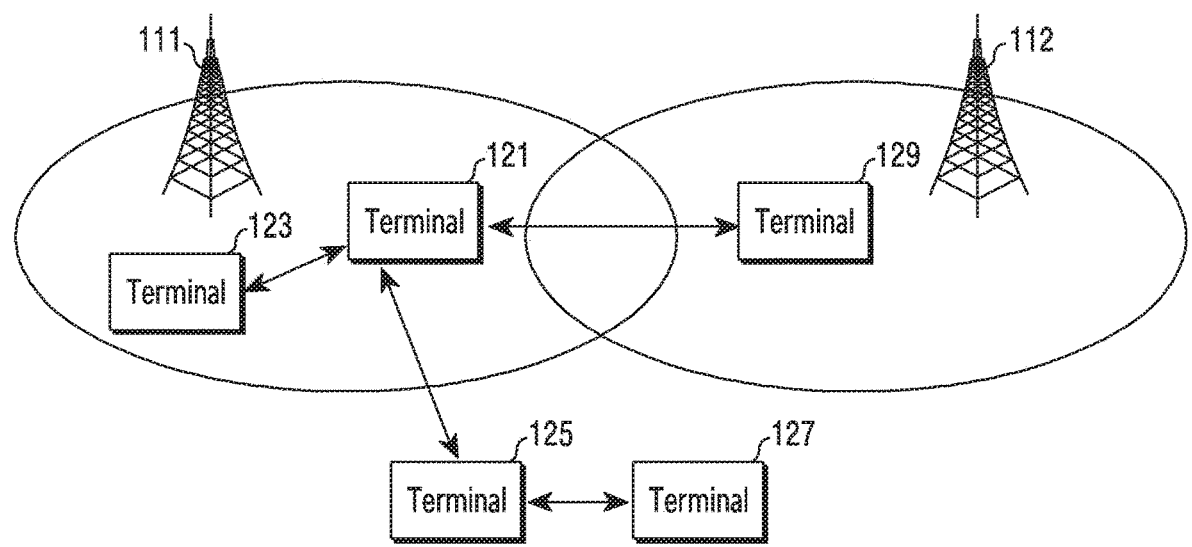
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments will be described based on an approach of hardware. However, various embodiments include a technology that uses both hardware and software and thus, the various embodiments may not exclude the perspective of software.

Hereinafter, the disclosure relates to an apparatus and method for configuring a resource area, allocating a specific resource, or selecting a resource in a configured resource area in a wireless communication system. Specifically, the disclosure describes a technique for, when messages of different vehicle apparatuses are transmitted, preventing collisions between the messages in a wireless communication system.

Terms and units indicating a time resource (e.g., symbols, slots, subframes, frames, periods, and intervals), terms and units indicating a frequency resource (e.g., subcarriers, carriers, bandwidths, cells, bands, resource block elements, resource blocks, and resource block groups), terms referring to network entities, terms referring to elements of apparatuses, etc., which are used in the following description, are illustrated for the convenience of description. Accordingly, the disclosure is not limited to the following terms and other terms having the same technical meaning may be used.

Further, the disclosure describes various embodiments using terms used in some communication standards or organizations (e.g., the 3rd generation partnership project (3GPP), the society of automotive engineers (SAE), the institute of electrical and electronics engineers (IEEE), and the national highway traffic safety administration (NHTSA)), but this is only an example for description.

Various embodiments may also be easily modified and applied to other communication systems.

FIG. 1 illustrates a wireless communication system according to an embodiment of the disclosure.

Referring to FIG. 1, FIG. 1 illustrates a first base station 111, a second base station 112, and terminals 121, 123, 125, 127, and 129 as a part of nodes using a wireless channel in a wireless communication system.

The first base station 111 and the second base station 112 are network infrastructures that provide wireless access to the terminals 121, 123, 125, 127, and 129. The first base station 111 and the second base station 112 have coverage defined as a predetermined geographic area on the basis of the distance over which a signal may be transmitted. In addition to a base station, the first base station 111 and the second base station 112 may be referred to as an "access point (AP)", an "eNodeB (eNB)", a "5G generation node (5G node)", a "5G NodeB (NB)", a "wireless point", a "transmission/reception point (TRP)", a "distributed unit (DU)", a "radio unit (RU)", a "remote radio head (RRH)", or other terms having equivalent technical meanings. A cell may indicate an area that may be covered by a single base station. A single base station may cover one cell and may cover multiple cells. Here, each cell may be divided by a supported frequency and an area of a sector to cover. In the following description, a base station may be used as a term including a cell, or a cell may be used as a term referring to a base station.

Each of the terminals 121, 123, 125, 127, and 129 is an apparatus used by a user, and performs communication with the first base station 111 and the second base station 112 via a wireless channel. In some cases, at least one of the terminals 121, 123, 125, 127, and 129 may be operated without involvement of a user. That is, at least one of the terminals 121, 123, 125, 127, and 129 is an apparatus that performs machine type communication (MTC) and may not be carried by a user. Each of the terminals 121, 123, 125, 127, and 129 may be referred to as, in addition to a terminal, a "user equipment (UE)", a "customer premises equipment (CPE)", a "mobile station", a "subscriber station", a "remote terminal", a "wireless terminal", a "vehicle user equipment", an "electronic device", a "user device", or other terms having equivalent technical meanings.

Referring to FIG. 1, various embodiments in which communication may be performed are illustrated. For example, communication may be performed between the first base station 111 and the terminal 121. The first base station 111 may transmit a downlink (DL) signal to the terminal 121, or the terminal 121 may transmit an uplink (UL) signal to the first base station 111. As another example, communication may be performed using a direct link between any two terminals. That is, communication may be performed using a direct link between two terminals 121 and 123 within a service range of the first base station 111, communication may be performed using a direct link between one terminal 121 within the service range of the first base station 111 and one terminal 125 outside the service range of the first base station 111, and communication may be performed using a direct link between two terminals 125 and 127 outside the service range of the first base station 111. Alternatively, communication may be performed using a direct link between the terminals 121 and 129 within service ranges of the different base stations 111 and 112, respectively.

The terminals 121 and 123 within the service range of the first base station 111 may configure parameters for communication by the first base station 111, and the terminal 129 within the service range of the second base station 112 may configure parameters for communication by the second base station 112, and the terminals 125 and 127 located outside the service range of the first base station 111 may perform operations according to a pre-defined configuration. In the disclosure, the terminals 121, 123, 125, 127, and 129 may operate as a transmission end or a reception end in performing communication with each other. The roles of the transmission end and the reception end may not be fixed, and may be variable. For example, the terminal 121 may operate as a transmission end at one time point, and may operate as a reception end at another time point. Alternatively, the terminal 121 may operate as a transmission end in one frequency band, and may operate as a reception end in another frequency band.

The terminals 121, 123, 125, 127, and 129 may use an intelligent transportation system (ITS) band (e.g., 5.9 GHz) for communication. At least one of the terminals 121, 123, 125, 127, and 129 may be implemented inside a vehicle. That is, at least one of the terminals 121, 123, 125, 127, and 129 may support a vehicle to everything (V2X) communication technology. V2X communication may fundamentally include a vehicle-to-vehicle (V2V) scheme that is a communication scheme between a vehicle and a vehicle, a vehicle-to-pedestrian (V2P) scheme, and a vehicle-to-infrastructure/network (V2I/N) which means communication between a vehicle and a roadside unit or communication between networks. Hereinafter, the disclosure is described based on the V2V scheme that is a communication scheme between a vehicle and a vehicle, but is not limited thereto. When a message to be periodically transmitted and received, such as a safety message (e.g., a basic safety message (BSM)), is required, various embodiments of the disclosure may be applicable to V2P and V2I/N as well as V2V.

Figure 2:
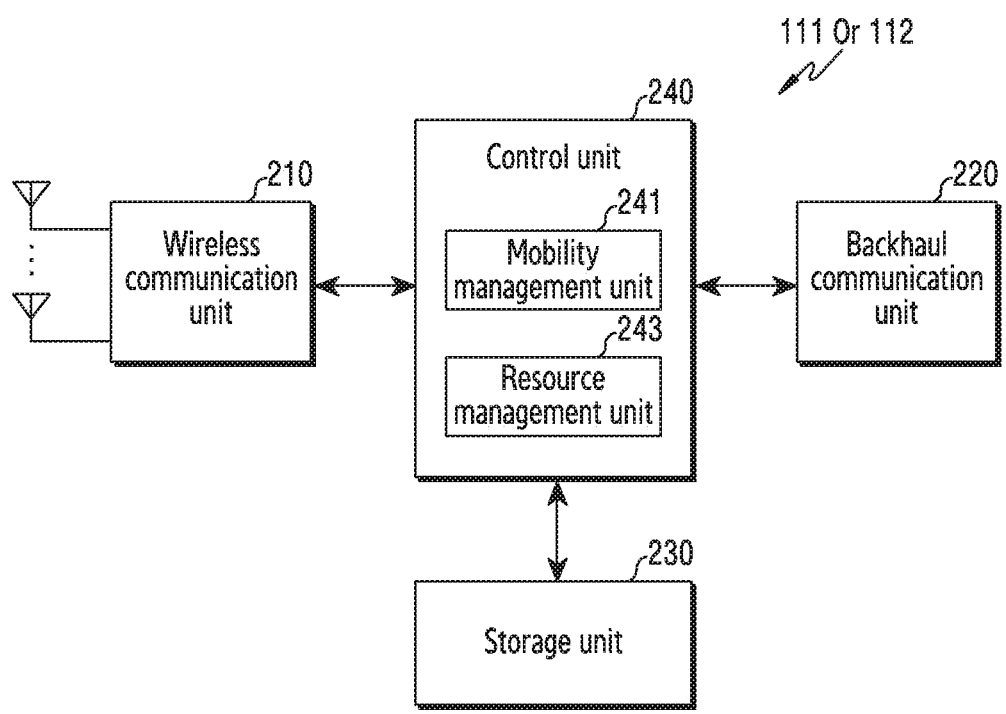
FIG. 2 illustrates a block diagram of a base station in a wireless communication system according to an embodiment of the disclosure.

FIG. 2 illustrates a block diagram of a base station in wireless communication system according to an embodiment of the disclosure. The configuration illustrated in FIG. 2 may be understood as the configuration of the first base station 111 or the second base station 112. The term "—unit" or "—er" used hereinafter may refer to a unit for processing at least one function or operation and may be implemented in hardware, software, or a combination of hardware and software.

Referring to FIG. 2, the base station 111 or 112 includes a wireless communication unit 210, a backhaul communication unit 220, a storage unit 230, and a control unit 240.

The wireless communication unit 210 performs functions to transmit or receive a signal through a wireless channel. For example, the wireless communication unit 210 performs a function of conversion between a baseband signal and a bit stream according to a physical layer standard of a system. For example, when data is transmitted, the wireless communication unit 210 generates complex symbols by encoding and modulating a transmission bit stream. Also, when data is received, the wireless communication unit 210 restores a reception bit stream by demodulating and decoding a baseband signal.

Also, the wireless communication unit 210 up-converts a baseband signal into a radio frequency (RF) band signal and transmits the same through an antenna, and down-converts a RF band signal received through an antenna into a baseband signal. To this end, the wireless communication unit 210 may include a transmission filter, a reception filter, an amplifier, a mixer, an oscillator, a digital-to-analog convertor (DAC), an analog-to-digital convertor (ADC), and the like. Also, the wireless communication unit 210 may include multiple transmission/reception paths. Further, the wireless communication unit 210 may include at least one antenna array including multiple antenna elements.

In terms of hardware, the wireless communication unit 210 may include a transceiver, a digital unit, and/or an analog unit, wherein the analog unit includes multiple sub-units according to an operating power, an operating frequency, and the like. The digital unit may be implemented as at least one processor (e.g., a digital signal processor (DSP)).

The wireless communication unit 210 transmits and receives a signal as described above. Accordingly, all or a part of the wireless communication unit 210 may be referred to as a "transmitter", a "receiver", or a "transceiver". Transmission and reception performed through a wireless channel, which will be described in the following descriptions, may be understood to mean that the above-described processing is performed by the wireless communication unit 210.

The backhaul communication unit 220 provides an interface for performing communication with other nodes within the network. That is, the backhaul communication unit 220 converts a bit stream transmitted from the base station to another node, for example, another access node, another base station, a higher node, or a core network, into a physical signal, and converts a physical signal received from another node into a bit stream.

The storage unit 230 may store data, such as a basic program for operation of a base station, an application program, configuration information, and the like. The storage unit 230 may include a volatile memory, a non-volatile memory, or a combination of a volatile memory and a non-volatile memory. The storage unit 230 provides stored data in response to a request of the control unit 240.

The control unit 240 controls overall operations of the base station. For example, the control unit 240 transmits and receives a signal via the wireless communication unit 210 or the backhaul communication unit 220. Further, the control unit 240 records data in the storage unit 230 and reads the recorded data. The control unit 240 may perform functions of a protocol stack required by the communication standard. According to another implement, the processor stack may be included in the wireless communication unit 210. To this end, the control unit 240 may include at least one processor. According to various embodiments of the disclosure, the control unit 240 may include a mobility management unit 241 that determines whether a vehicle apparatus is located at a cell edge or at a cell boundary, and a resource management unit 243 that allocates a resource to the vehicle apparatus or configures a resource area to the vehicle apparatus. The mobility management unit 241 and the resource management unit 243 may be instruction sets/codes stored in the storage unit 230, which have been at least temporarily resided in the control unit 240, or storage spaces that store the instructions/codes, or may be a part of a circuit (circuitry) constituting the control unit 240. According to various embodiments, the control unit 240 may control an operation apparatus to perform operations described below.

According to various embodiments of the disclosure, an apparatus of a base station in a wireless communication system may include at least one transceiver and at least one processor operatively coupled to the at least one transceiver, wherein the at least one processor is configured to acquire a channel quality of a first vehicle apparatus; determine a resource allocation area of the first vehicle apparatus according to the channel quality; and transmit, to the first vehicle apparatus, allocation information relating to a transmission resource determined in the resource allocation area, wherein the transmission resource is used by the first vehicle apparatus to transmit a message to a second vehicle apparatus.

According to various embodiments, the at least one processor may be configured, in order to determine the resource allocation area, to determine whether the first vehicle apparatus satisfies a specific condition on the basis of the channel quality, and when the specific condition is not satisfied, determine a common resource area as the resource allocation area and when the specific condition is satisfied, determine the specific resource area as the resource allocation area, wherein the common resource area includes resources available to the base station and at least one other base station different from the base station and the specific resource area is resources dedicated to the base station.

According to various embodiments, the at least one processor may be configured, in order to determine the specific resource area as the resource allocation area, to acquire identification information of the base station, and determine the specific resource area in all available resource areas on the basis of the identification information, wherein the all available resource areas include the common resource area.

According to various embodiments, the specific resource area may be identified among a plurality of resource areas, the plurality of resource areas may correspond to different base stations, respectively, and the plurality of resource areas may be areas that do not overlap each other on a time-frequency resource grid.

According to various embodiments, the at least one processor may be configured, in order to determine whether the first vehicle apparatus satisfies the specific condition, to acquire a first channel quality for a serving cell of the base station of the first vehicle apparatus and when the first channel quality exceeds a threshold value, determine that the specific condition is not satisfied, and when the first channel quality is equal to or below the threshold value, determine that the specific condition is satisfied.

According to various embodiments, the at least one processor may be configured, in order to determine whether the first vehicle apparatus satisfies the specific condition, to acquire a first channel quality for a serving cell of the base station of the first vehicle apparatus, acquire a second channel quality for a serving cell of another base station of the first vehicle apparatus and when a value obtained by subtracting the first channel quality from the second channel quality is equal to or smaller than a threshold value, determine that the specific condition is not satisfied, and when a difference between the first channel quality and the second channel quality exceeds the threshold value, determine that the specific condition is satisfied.

According to various embodiments, the at least one processor may be configured, in order to acquire the channel quality, to receive a measurement report from the first vehicle apparatus, wherein the measurement report includes at least one of a reception signal intensity for a reference signal transmitted from the base station or a reception signal intensity for a reference signal transmitted from another base station.

According to various embodiments, the at least one processor may be further configured to transmit, to the vehicle apparatus, a configuration message including information relating to the determined resource area, the transmission resource may be a resource allocated for a prose siPC5 communication interface, the allocation information may be included in sidelink control information (SCI) so as to be transmitted, the SCI may be included in downlink control information (DCI) so as to be transmitted, and the message may be transmitted by radio resource control (RRC) signaling.

Figure 3:
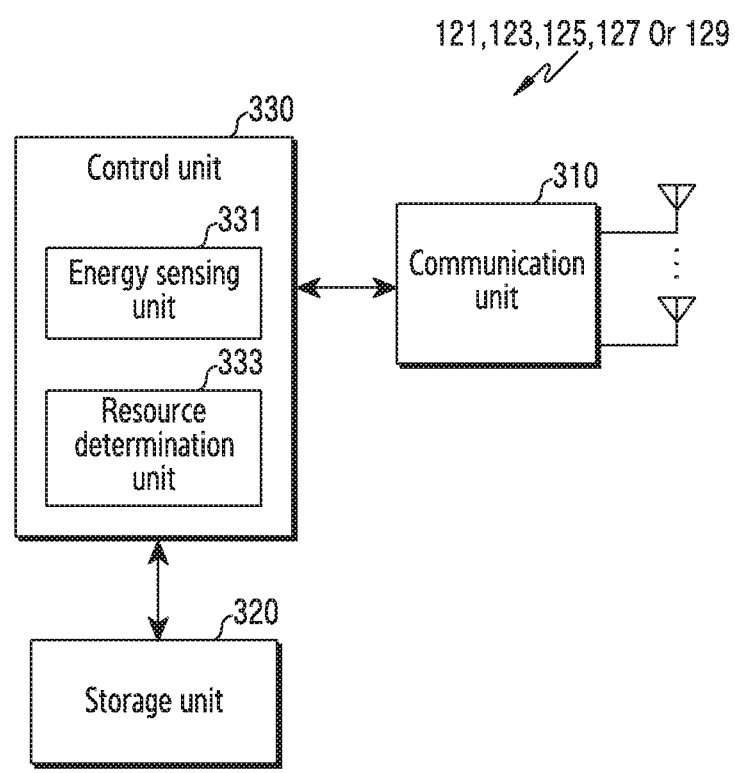
FIG. 3 illustrates a block diagram of a vehicle apparatus in a wireless communication system according to an embodiment of the disclosure.

FIG. 3 illustrates a block diagram of a vehicle apparatus in a wireless communication system according to an embodiment of the disclosure. The vehicle apparatus of FIG. 3 may be understood as one element among the terminals 121, 123, 125, 127, and 129. The term "—unit" or "—er" used hereinafter may refer to a unit for processing at least one function or operation and may be implemented in hardware, software, or a combination of hardware and software.

Referring to FIG. 3, the terminal 121, 123, 125, 127, and 129 may include a communication unit 310, a storage unit 320, and a control unit 330.

In terms of hardware, the communication unit 310 may include a transceiver, a digital unit, and/or an analog unit, wherein the analog unit includes multiple sub-units according to an operating power, an operating frequency, and the like. The digital unit may be implemented as at least one processor (e.g., a digital signal processor (DSP)).

The communication unit 310 performs functions for transmitting or receiving a signal through a wireless channel. For example, the communication unit 310 performs a function of conversion between a baseband signal and a bit stream according to a physical layer standard of a system. For example, when data is transmitted, the communication unit 310 generates complex symbols by encoding and modulating a transmission bit stream. Also, when data is received, the communication unit 310 restores a reception bit stream by demodulating and decoding a baseband signal. Also, the communication unit 310 up-converts a baseband signal into an RF band signal and transmits the same through an antenna, and down-converts an RF band signal received through an antenna into a baseband signal. For example, the communication unit 310 may include a transmission filter, a reception filter, an amplifier, a mixer, an oscillator, a DAC, an ADC, and the like.

Also, the communication unit 310 may include a plurality of transmission/reception paths. Further, the communication unit 310 may include at least one antenna array including multiple antenna elements. In terms of hardware, the communication unit 310 may include a digital circuit and an analog circuit (e.g., a radio frequency integrated circuit (RFIC)). The digital circuit and the analog circuit may be implemented in a single package. The communication unit 310 may include a plurality of RF chains. Further, the communication unit 310 may perform beamforming.

In addition, the communication unit 310 may include a plurality of communication modules for supporting a plurality of different wireless access technologies. For example, different wireless access technologies may include Bluetooth low energy (BLE), wireless fidelity (Wi-Fi), Wi-Fi gigabyte (WiGig), cellular networks (e.g., long term evolution (LTE)), new radio (NR), and the like. Different frequency bands may include a super high frequency (SHF) (e.g., 3.5 GHz, 5 GHz) band, an ITS band (e.g., 5.9 GHz), and a millimeter wave (e.g., 60 GHz) band.

The communication unit 310 transmits and receives a signal as described above. Accordingly, all or a part of the communication unit 310 may be referred to as a "transmitter", a "receiver", or a "transceiver". Also, transmission and reception performed through a wireless channel, which will be described in the following descriptions, may be understood to mean that the above-described processing is performed by the communication unit 310.

The storage unit 320 may store data, such as a basic program for operation of a UE, an application program, configuration information, and the like. The storage unit 320 may include a volatile memory, a non-volatile memory, or a combination of a volatile memory and a non-volatile memory. The storage unit 320 provides stored data in response to a request of the control unit 330.

The control unit 330 controls overall operations of the UE. For example, the control unit 330 transmits and receives a signal via the communication unit 310. Further, the control unit 330 records data in the storage unit 320 and reads the recorded data. The control unit 330 may perform functions of a protocol stack required by the communication standard. To this end, the control unit 330 may include at least one processor or a micro-processor, or may be a part of a processor. A part of the communication unit 310 and the control unit 330 may be referred to as a communication processor (CP). According to various embodiments, the control unit 330 may include at least one telematics control unit (TCU) and/or at least one electronic control unit (ECU). The TCU is an electronic control module used for connection of a transmission line, timing maintenance of a signal, an error control, and the like, and may be configured to control a vehicle apparatus to transmit or receive a radio signal. The ECU may be configured to control devices that perform various functions in the vehicle apparatus.

According to various embodiments, the control unit 330 may include an energy sensing unit 331 that determines whether a specific resource (e.g., a sub-channel) is in use by a neighboring node, and a resource determination unit 333 that identifies a resource allocated from the base station or selects a resource within a resource area configured by the base station. The energy sensing unit 331 and the resource determination unit 333 may be instruction sets/codes stored in the storage unit 320, which have been at least temporarily resided in the control unit 330, or storage spaces that store the instructions/codes, or may be a part of a circuit (circuitry) constituting the control unit 330. According to various embodiments, the control unit 330 may control an operation apparatus to perform operations described below.

According to various embodiments of the disclosure, a vehicle apparatus in a wireless communication system may include at least one transceiver and at least one processor operatively coupled to the at least one transceiver. The at least one processor is configured to perform energy sensing, receive resource allocation information relating to a transmission resource, determine whether the transmission resource is being used by another node on the basis of the energy sensing, and when the transmission resource is being used by the other node, transmit a message to another vehicle apparatus on an available channel acquired by the energy sensing, and when the transmission resource is not being used by the other node, transmit a message to another vehicle apparatus on the transmission resource.

According to various embodiments, the at least one processor may also be configured, in order to perform the energy sensing, to perform the energy sensing when a channel quality for a serving cell of the vehicle apparatus exceeds a threshold value, wherein the channel quality includes a reference signal received power (RSRP).

Figure 4:
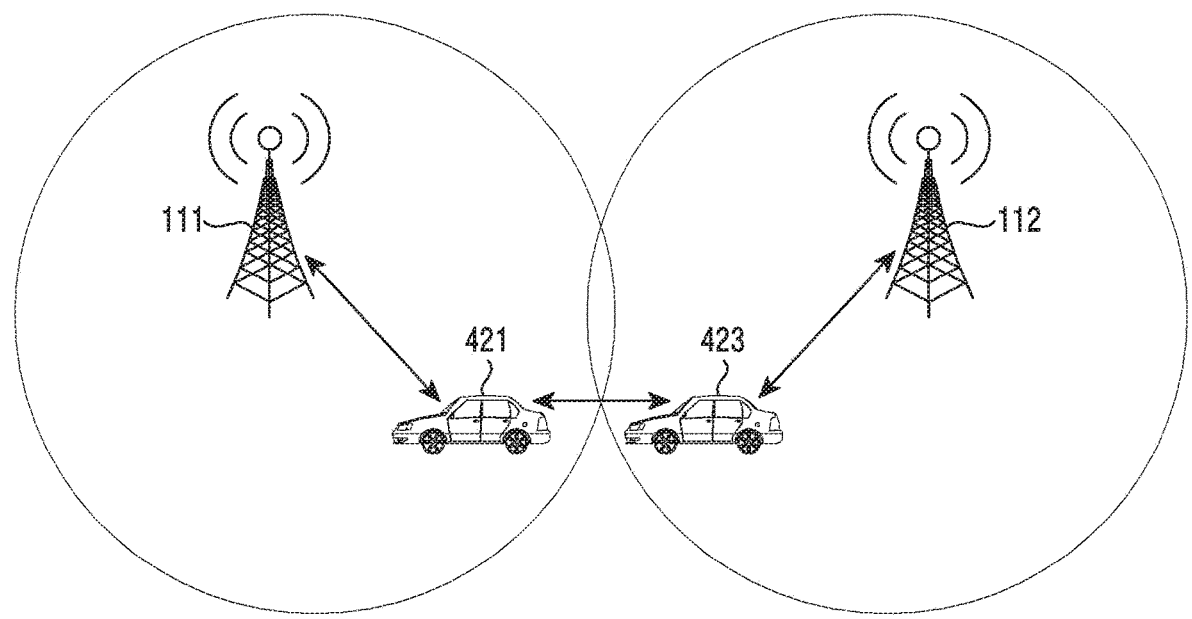
FIG. 4 illustrates an example of message transmission by a vehicle apparatus located at a cell edge in a wireless communication system according to an embodiment of the disclosure.

FIG. 4 illustrates an example of message transmission by a vehicle apparatus located at a cell edge in a wireless communication system according to an embodiment of the disclosure. Different base stations of FIG. 4 illustrate the first base station 111 or the second base station 112 of FIG. 1. The vehicle apparatus illustrates the terminals 121, 123, 125, 127, and 129 of FIG. 1.

Referring to FIG. 4, a first vehicle apparatus 421 may transmit a message to another vehicle apparatus. The first vehicle apparatus 421 according to various embodiments may transmit a basic safety message for inter-vehicle communication. The first vehicle apparatus 421 may broadcast, to a neighboring vehicle apparatus, a message including at least one of a speed of the first vehicle apparatus 421, location information of the first vehicle apparatus 421, or driving information of the first vehicle apparatus 421. Resource allocation is required in advance for transmission of the message. Transmission resources for inter-vehicle communication may be determined in various ways.

In various embodiments, transmission resources may be determined by the base station. For example, the first base station 111 may allocate a resource to the first vehicle apparatus 421. For example, in an LTE communication system, mode 3 in which an eNB intervenes in selection and management of a resource may be defined. For V2V communication, that is, PC5 interface communication, the eNB may directly schedule transmission resources of the vehicle apparatus. In various embodiments, transmission resources may be determined by the vehicle apparatus. The base station may determine the transmission resources by configuring a resource pool to vehicle apparatuses and directly selecting an arbitrary resource within the resource pool. For example, in the LTE communication system, mode 4 in which an eNB does not intervene in selection and management of a resource may be defined. A UE for a vehicle may select, by itself, a resource for V2V communication, that is, PC5 interface communication, within a resource pool configured by the eNB.

The first vehicle apparatus 421 may transmit a message to another vehicle apparatus (e.g., a second vehicle apparatus 423) by means of a determined transmission resource. When the base station directly determines the resource (e.g., mode 3 of LTE), vehicle apparatuses located in the cell of the base station may transmit or receive a message without collision within limited resources. This is because the base station allocates resources to vehicle apparatuses within the cell on the available resources, respectively, so that the resources do not overlap. Meanwhile, resources are allocated to vehicle apparatuses within the cell without collision, but a situation may be different at the boundary of the cell. For example, the first vehicle apparatus 421 allocated with a resource from the first base station 111 and the second vehicle apparatus 423 allocated with a resource from a neighboring base station may be allocated the same transmission resource. This is because a scheduler that allocates a resource operates independently for each base station. Therefore, even though there is a sudden stop vehicle, the situation may not be recognized by a V2X communication technology. A method of defining an independent resource allocation area for each base station may be considered, but it is not easy to distinguish all base stations (or cells), and a predetermined resource area may not be efficiently used. Accordingly, a resource management method for preventing resource areas allocated between vehicles from overlapping is required. Hereinafter, the disclosure proposes an apparatus and method for stably supporting a V2X service in cellular communication.

In order to provide stable vehicle service, various embodiments of the disclosure describe a resource allocation method for preventing a collision when resources of base stations are allocated respectively. A message of a vehicle apparatus located at a cell edge is physically adjacent to a message transmitted from a vehicle device located at an edge of another cell, and thus has a high probability of colliding when transmitted on the same transmission resource. Therefore, the base station needs to perform resource allocation for a vehicle apparatus located at a cell edge in a manner different from that of a vehicle apparatus that is not located at a cell edge. The base station may perform resource allocation (hereinafter, location-based resource allocation) on the basis of a location of a vehicle apparatus within a cell. Hereinafter, a location-based resource allocation scheme of the base station will be described with reference to FIGS. 5, 6, 7A, and 7B.

Figure 5:
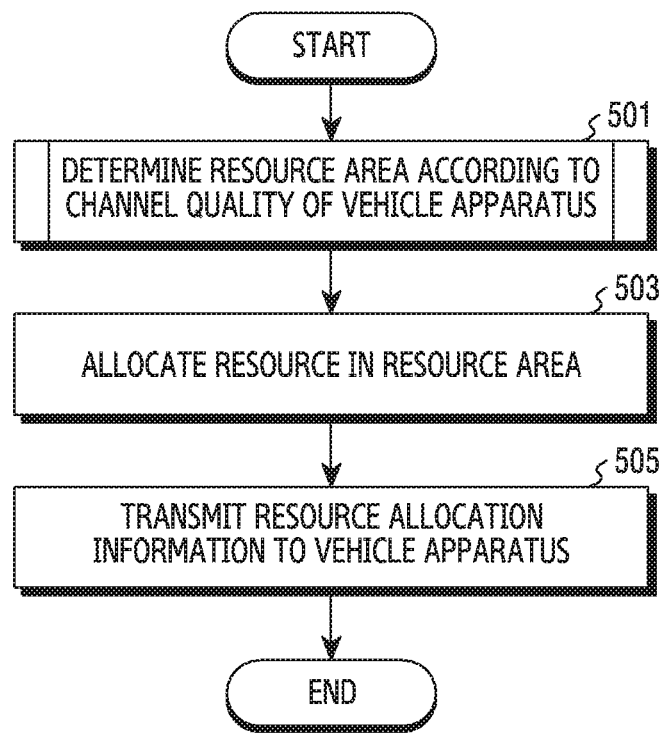
FIG. 5 illustrates a flowchart of operations of a base station that performs location-based resource allocation in a wireless communication system according to an embodiment of the disclosure.

FIG. 5 illustrates a flowchart of operations of a base station that performs location-based resource allocation in a wireless communication system according to an embodiment of the disclosure. Base stations of FIG. 5 illustrate the first base station 111 or the second base station 112 of FIG. 1, 2, or 4. Resources allocated by the base station may be used for communication between vehicle apparatuses. A vehicle apparatus illustrates the terminals 121 to 129 of FIGS. 1 and 3, or the first vehicle apparatus 421 or the second vehicle apparatus 423 of FIG. 4.

Referring to FIG. 5, in operation 501, the base station may determine a resource area according to a channel quality of the vehicle apparatus. The base station may acquire information relating to the channel quality of the vehicle apparatus. The information relating to the channel quality of the vehicle apparatus may include at least one of a channel quality for a cell of a serving base station, which is measured by the vehicle apparatus, a channel quality for a cell of a neighboring base station, which is measured by the vehicle apparatus, or a channel quality measured by the base station on the basis of signals transmitted by the vehicle apparatus.

The base station may identify a location of the vehicle apparatus within a cell on the basis of the channel quality of the vehicle apparatus. The base station may determine whether the vehicle apparatus is located at a cell edge on the basis of the channel quality of the vehicle apparatus. Criteria for the cell edge may be defined according to whether a cell edge condition configured by the base station is satisfied. The base station may determine whether the cell edge condition is satisfied, on the basis of at least one of comparison between a threshold value and the channel quality of the serving cell, comparison between the channel quality of the serving cell and the channel quality of the neighboring cell, and a change in the channel quality.

According to various embodiments, the base station may allocate a resource on the basis of a location of the vehicle apparatus within the cell. When the vehicle apparatus satisfies the cell edge condition, the base station may recognize that the vehicle apparatus is at the cell edge. A specific resource area may be defined to prevent a collision when messages are transmitted between vehicle apparatuses connected to different base stations. Such a specific resource area generally refers to all resource areas allocable to the vehicle apparatus by any base station for V2V communication (e.g., PC5 interface communication) or a subset of all resource areas, and may be a concept distinguished from a resource pool common to the base stations. The specific resource area may be a resource area distinguished from a resource area of a neighboring base station, and may be referred to as a base station-specific resource area, an eNB-specific resource area, a cell-specific resource area, and the like. The base station may determine the specific resource area as a resource area for V2V communication. When the vehicle apparatus does not satisfy the cell edge condition, the base station may determine a common resource area. The common resource area is a concept opposite to the specific resource area, and may mean a resource area that is not dedicated to a specific base station. The common resource area may include all available areas or a part of resource areas configured to be shared between base stations, from among all available resource areas. The base station may determine the common resource area as a resource area for PC5 interface communication.

Although not illustrated in FIG. 5, the base station may transmit information relating to the determined resource area to the vehicle apparatus. For example, the determined resource area may be referred to as a resource pool. The base station may transmit, to the vehicle apparatus, information relating to a resource pool that is a common resource area or information relating to a resource pool that is a specific resource area. The base station according to various embodiments may dynamically indicate the terminal of a transmission resource selected later, by configuring a resource pool in the vehicle apparatus. According to an embodiment, the information relating to the resource area may be transmitted by higher layer signaling (e.g., radio resource control (RRC) signaling). According to various embodiments, implementation of the embodiments of the disclosure may be determined by configuring the same resource pool in the vehicle apparatuses at the cell edge. According to various embodiments, implementation of the embodiments of the disclosure may be determined by further confirming that there is a difference between a resource pool allocated to a vehicle located at the cell edge and a resource pool allocated to a vehicle located at the cell center. Further, the base station according to various embodiments may configure a resource area to the vehicle apparatus semi-persistently.

In operation 503, the base station may allocate a resource in the resource area. The base station may allocate a resource for the vehicle apparatus in the resource area determined in operation 501, which is a common resource area or a specific resource area. The base station may select a resource to be allocated in the resource area. According to another embodiment, the base station may determine any resource among resources located in the resource area. According to another embodiment, the base station may determine a resource to be allocated to the vehicle apparatus from among the resources located in the resource area according to a predefined scheduling rule. Although not illustrated in FIG. 5, the vehicle apparatus may request transmission resources to be allocated in advance from the base station. For example, the vehicle apparatus may transmit, to the base station, a buffer status report (BSR) for requesting transmission resources for PC5 interface communication from the base station. The base station may determine and allocate transmission resources on the basis of the request made by the vehicle apparatus.

In operation 505, the base station may transmit resource allocation information to the vehicle apparatus. The base station may transmit the resource allocation information to the vehicle apparatus via a downlink. The base station may transmit downlink control information (DCI) including the resource allocation information to the vehicle apparatus. For example, in an LTE communication system, the base station may transmit downlink control information to the vehicle apparatus by using DCI format 5A. The downlink control information may include sidelink control information for communication between the vehicle apparatus and another device. The sidelink control information refers to information relating to scheduling assignment (SA) for sidelink data, which is transmitted on a control channel (e.g., PSCCH) for the sidelink data.

The resource allocation information may include transmission resources for a message from the vehicle apparatus to another vehicle apparatus. For example, in the LTE communication system, the base station may configure resource allocation information by using SCI format 1. Although not illustrated in FIG. 5, the vehicle apparatus may acquire resource allocation information from the downlink control information received from the base station. The base station may dynamically allocate a resource for sidelink data to the vehicle apparatus on the basis of the downlink control information. Further, according to an embodiment, the vehicle apparatus may transmit a message to another vehicle apparatus by using a transmission resource periodically configured for a predetermined interval, according to a configuration of the base station. The base station may select and allocate, semi-persistently, periodic transmission resources as well as a resource area.

As described above, each base station allocates a resource selected on a specific resource area to a terminal located at a cell edge, so that a transmission resource of the vehicle apparatus may not overlap the transmission resource of the vehicle apparatus of an adjacent base station. This is because the specific resource area of the serving base station and the specific resource area of the neighboring base station are different from each other. According to another embodiment, the specific resource area of the base station may be configured not to overlap a specific resource area of at least one base station adjacent to the base station.

Figure 6:
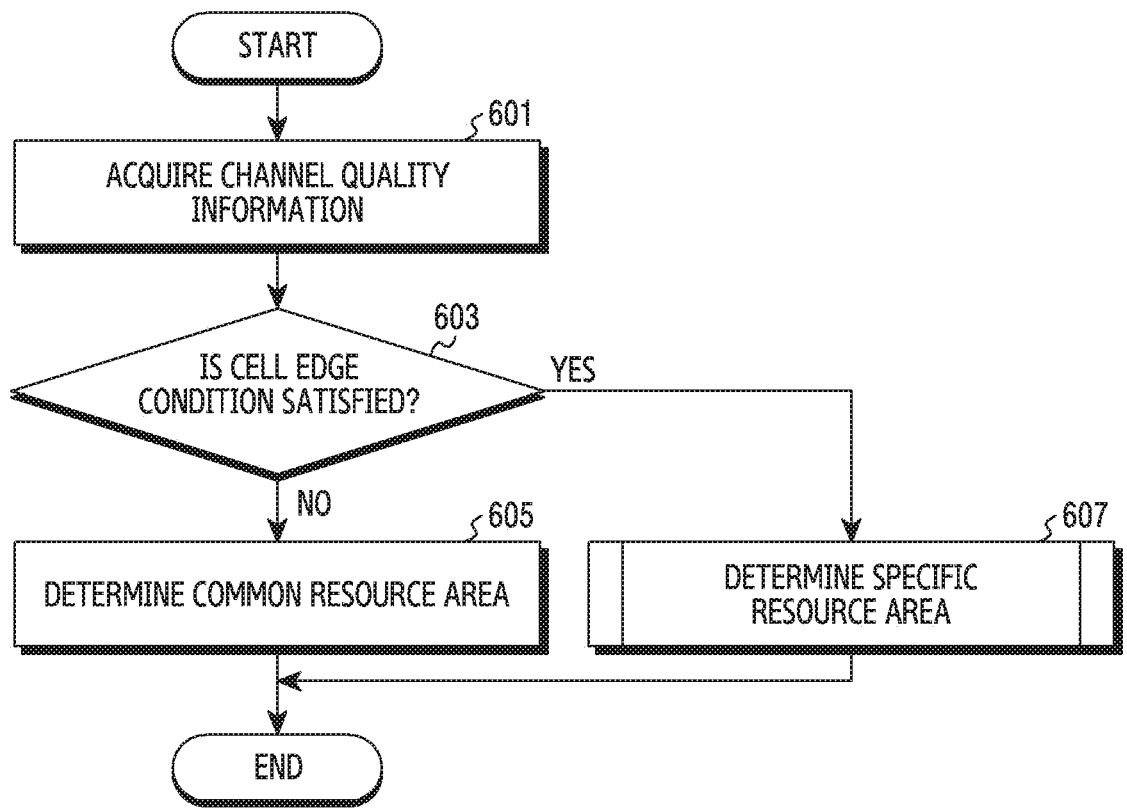
FIG. 6 illustrates a flowchart of operations of a base station that determines a resource area in a wireless communication system according to an embodiment of the disclosure.

FIG. 6 illustrates a flowchart of operations of a base station that determines a resource area in a wireless communication system according to an embodiment of the disclosure. Base stations of FIG. 6 illustrate the first base station 111 or the second base station 112 of FIG. 1, 2, or 4. FIG. 6 is a part of operation 501 of FIG. 5, and an operation flow of FIG. 6 may be understood as an operation of the base station or an element of the base station.

Referring to FIG. 6, in operation 601, the base station may acquire channel quality information. The base station may acquire channel quality information for a vehicle apparatus connected to the base station. A channel quality of the disclosure may be at least one of a beam reference signal received power (BRSRP), a reference signal received power (RSRP), a reference signal received quality (RSRQ), a received signal strength indicator (RSSI), a signal to interference and noise ratio (SINR), a carrier to interference and noise ratio (CINR), a signal to noise ratio (SNR), an error vector magnitude (EVM), a bit error rate (BER), and a block error rate (BLER). In addition to the above described examples, other terms having equivalent technical meanings or other metrics indicating a channel quality may be used. In the disclosure, a high channel quality refers to a case in which a channel quality value related to a signal size is large or an error rate-related channel quality value is small. A higher channel quality may mean that a smooth wireless communication environment is guaranteed. According to various embodiments, as a channel quality for a serving base station (or a serving cell) is higher, the base station may determine that the vehicle apparatus is located further at the cell center. Conversely, as the channel quality for the serving base station is lower, the base station may determine that the vehicle apparatus is located further at a cell edge.

According to various embodiments, the base station may acquire channel quality information of the vehicle apparatus. The base station may acquire channel quality information measured by the vehicle apparatus. In some embodiments, the channel quality information measured by the vehicle apparatus may be channel quality information for a serving base station (or a serving cell). The base station may transmit a downlink signal to the vehicle apparatus. The base station may transmit a synchronization signal or a reference signal for measurement of a channel state to the vehicle apparatus. For example, the synchronization signal may be at least one among a primary synchronization signal (PSS), a secondary synchronization signal (SSS), an extended synchronization signal (ESS), and an Software block (or an SS/PBCH block). For example, the reference signal may be at least one among a beam reference signal (BRS), a beam refinement reference signal (BRRS), a cell-specific reference signal (CRS), a channel state information-reference signal (CSI-RS), and a demodulation-reference signal (DM-RS). The vehicle apparatus may transmit channel state information (CSI) on the basis of signals transmitted from the base station. According to various embodiments, information relating to the channel quality may include information relating to an intensity of a received signal (RSRP). In some embodiments, the channel quality information measured by the vehicle apparatus may be channel quality information for a neighboring base station (or a neighboring serving cell). The vehicle apparatus may measure a downlink signal (e.g., CRS) transmitted from the neighboring base station, and may transmit a measurement report including a result of measuring the downlink signal to the serving base station. The base station may acquire information relating to the channel quality on the basis of the measurement report received from the vehicle apparatus.

According to various embodiments, the base station may directly acquire channel quality information for the vehicle apparatus. The base station may acquire channel quality information for the vehicle apparatus by measuring a signal (e.g., a sounding reference signal (SRS) as an uplink signal) transmitted from the vehicle apparatus. For example, the base station may acquire channel quality information for the vehicle apparatus by measuring a reception intensity of an uplink signal transmitted from the vehicle apparatus.

In operation 603, the base station may determine whether a cell edge condition is satisfied. The base station may determine whether the vehicle apparatus satisfies the cell edge condition, on the basis of the channel quality information of the vehicle apparatus. Here, the cell edge condition is a condition for determining whether the vehicle apparatus is located at a cell edge, and may be defined as one condition or may be defined with a sufficient condition of satisfying a plurality of conditions according to various embodiments.

According to various embodiments, the base station may determine whether the cell edge condition is satisfied, according to whether a channel quality value of the serving base station for the vehicle apparatus exceeds a threshold value. For example, when an RSRP value measured by the vehicle apparatus is equal to or smaller than a preconfigured threshold value, the base station may determine that the cell edge condition is satisfied. This is because a relatively low reception power may mean that a corresponding apparatus is located relatively near a cell boundary. For example, when an RSRP value of a signal transmitted from the vehicle apparatus exceeds a specific threshold value, the base station may determine that the cell edge condition is not satisfied. This is because a relatively high reception power indicates that a corresponding apparatus is close to the base station.

According to various embodiments, the base station may determine whether the cell edge condition is satisfied, on the basis of a channel quality of a serving base station for the vehicle apparatus and a channel quality of a neighboring base station. For example, the base station may determine whether the cell edge condition is satisfied, according to whether a difference between the channel quality of the neighboring base station and the channel quality of the serving base station exceeds a threshold value. For example, if the RSRP for the neighboring cell is x dB (e.g., x<3) higher than the RSRP for the serving cell, the base station may determine that the cell edge condition is satisfied.

According to various embodiments, the base station may determine whether the cell edge condition is satisfied, on the basis of a measurement report triggering event. The measurement report triggering event may refer to a condition for transmitting a measurement report that informs the base station that the vehicle apparatus (i.e., the terminal) needs handover.

According to various embodiments, the base station may configure a threshold value related to the cell edge condition. In some embodiments, the base station may configure the threshold value related to the cell edge condition on the basis of statistical information. For example, when performing handover, the base station may configure the threshold value related to the cell edge condition, on the basis of statistical information for the RSRP value of the serving cell. In some other embodiments, the base station may configure the threshold value on the basis of offset values to be configured for the measurement report. The handover may be performed in a boundary area of a serving cell and a target cell, so that the vehicle apparatus may be located at the cell edge immediately before or at the handover. The measurement report is to request, by the terminal, the base station to determine handover, and the base station may thus configure a threshold value on the basis of a triggering condition of the measurement report.

Although not located at the cell edge, a communication path may not be secured due to an obstacle (e.g., a building), or a channel quality may be lowered due to ambient interference. In order to compensate for this, the base station may define the cell edge condition with a sufficient condition of satisfying all the plurality of conditions. According to various embodiments, the base station may acquire channel quality information for each of a plurality of neighboring base stations of the vehicle apparatus. The base station may determine, via a comparison between the serving base station and each neighboring base station, whether the cell edge condition is individually satisfied, and may determine that the vehicle apparatus is located at the cell edge when the condition related to all the plurality of neighboring base stations are satisfied. According to various embodiments, the base station may determine whether the cell edge condition is satisfied, by using additional information in addition to the channel quality information. The base station may determine whether the vehicle apparatus satisfies the cell edge condition, on the basis of driving information of the vehicle apparatus and location information (e.g., a global navigation satellite system (GNSS)) of the vehicle apparatus.

In operation 605, the base station may determine a common resource area. The common resource area may be a resource area that may be used by any other base station as well as the serving base station. In other words, the common resource area may be an area including resources shared by at least two or more base stations, instead of resources exclusively allocated to a specific base station. The common resource area may include any available resources that are allocable for V2V communication, on a resource grid defined by time-frequency.

In operation 607, the base station may determine a specific resource area. In operation 607, the base station may determine a unique specific resource area thereto. According to various embodiments, the base station may identify a resource area corresponding to the base station from among a plurality of predefined areas. The base station may identify a resource area corresponding to the base station from among a plurality of areas on the basis of preconfigured information. According to various embodiments, the base station may determine a specific resource area on the basis of identification information of the base station. The identification information may be used to define an area specific to the base station from among all available resources, as information for specifying the base station.

According to various embodiments, the base station may determine a specific resource area. The base station may determine the specific resource area on a resource grid including a time domain and a frequency domain. According to various embodiments, the specific resource of the base station may be specified by a time resource unit (e.g., a frame, a subframe, a slot, and a symbol), a frequency resource unit (e.g., a bandwidth, a bandwidth part, a resource block (RB), a resource element (RE), and a subcarrier (SC)), or a resource pattern.

As described in operations 503 and 505 of FIG. 5, the base station may select a resource in the determined resource area (the common resource area or the specific resource area), and may transmit, to the vehicle apparatus, downlink control information including sidelink control information relating to the selected resource. Hereinafter, specific methods for determining a resource area will be described with reference to FIGS. 7A and 7B.

Figure 7A:
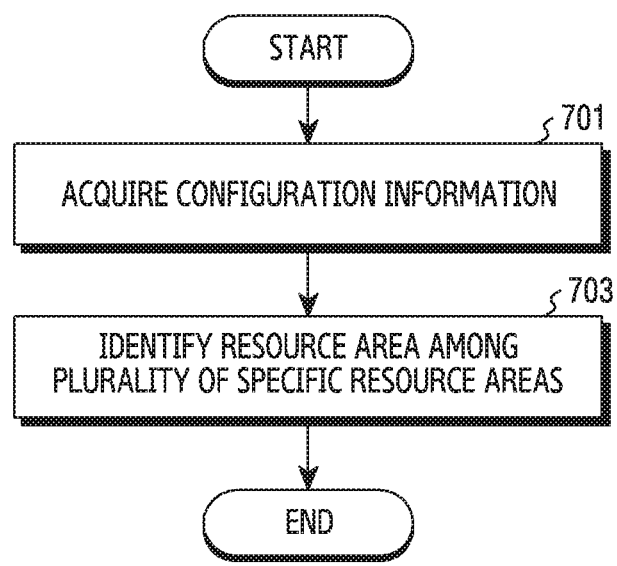
FIG. 7A illustrates a flowchart of operations of a base station that determines a specific resource area in a wireless communication system according to an embodiment of the disclosure.

FIG. 7A illustrates a flowchart of operations of a base station that determines a specific resource area in a wireless communication system according to an embodiment of the disclosure. Base stations of FIG. 7A illustrate the first base station 111 or the second base station 112 of FIG. 1, 2, or 4. FIG. 7A is a part of operation 607 of FIG. 6, and an operation flow of FIG. 7A may be understood as an operation of the base station or an element of the base station.

Referring to FIG. 7A, in operation 701, the base station may acquire configuration information. According to various embodiments, the configuration information refers to information preconfigured to the base station, and may indicate information configured by manual input of a network operator. The configuration information may include a parameter according to a business operator policy. The configuration information may include a preconfigured value indicating a resource area. For example, the preconfigured value may indicate symbols of specific numbers within a subframe. For example, the preconfigured value may indicate a specific carrier among a plurality of carriers. For example, the preconfigured value may be an index indicating a specific resource area among a plurality of resource areas.

In operation 703, the base station may identify the resource area from among the plurality of resource areas. The base station may identify the resource area from among predefined resource areas on the basis of the configuration information. According to various embodiments, a plurality of resource areas among all areas of transmission resources allocable for V2X communication may be defined. The plurality of resource areas may include a plurality of specific resource areas. According to various embodiments, the plurality of specific resource areas may be configured. The base station may identify the specific resource area configured to the base station, according to the configuration information from among the plurality of specific resource areas. The plurality of specific resource areas may not overlap each other. For example, the plurality of specific resource areas may be distinguished in a time division multiplexing manner. For example, the plurality of specific resource areas may be distinguished in a frequency division multiplexing manner.

In some embodiments, a value preconfigured by a business operator may refer to one carrier among eight carriers. All available resource areas for V2X communication may be divided into eight carriers. The base station may identify an area corresponding to one carrier among eight carriers, which is indicated by the preconfigured value, as a resource area specific to the base station. For example, the preconfigured value may include three bits. In some embodiments, the value preconfigured by the business operator may refer to one of nine resource zones. Resources included in nine resource zones may not overlap each other. The base station may identify, as the specific resource area, one resource zone among nine resource zones, which is indicated by the preconfigured value. In some other embodiments, the value preconfigured by the business operator may indicate at least one symbol. The at least one symbol may be indicated within 14 symbols of one TTI, which is a scheduling unit. The base station may identify a resource area corresponding to a symbol interval, which is indicated by the preconfigured value, as a resource area specific to the base station.

Figure 7B:
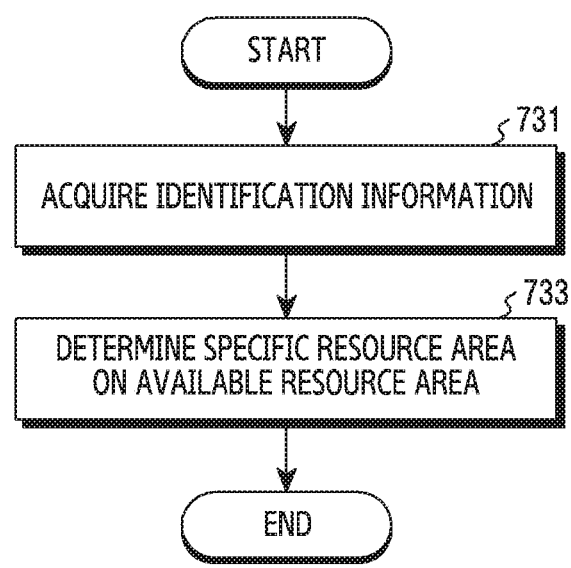
FIG. 7B illustrates a flowchart of operations of a base station that determines a specific resource area in a wireless communication system according to an embodiment of the disclosure.

FIG. 7B illustrates a flowchart of operations of a base station that determines a specific resource area in a wireless communication system according to an embodiment of the disclosure. Base stations of FIG. 7B illustrate the first base station 111 or the second base station 112 of FIG. 1, 2, or 4. FIG. 7B is a part of operation 607 of FIG. 6, and an operation flow of FIG. 7B may be understood as an operation of the base station or an element of the base station.

Referring to FIG. 7B, in operation 731, the base station may acquire identification information thereof. According to various embodiments, the identification information may include an identifier for distinguishing the base station from another base station. For example, the identification information may include a physical cell identifier (PCI). A serving cell of the base station may be distinguished from a cell of a neighboring base station by having a different PCI from that of the cell of the neighboring base station. For example, the identification information may include an eNB identifier (ID). Because the neighboring cell may have the same value as that of the identifier of the same serving cell, the base station may additionally consider an eNB ID. According to an embodiment, the identification information may include an evolved UNITS terrestrial radio access network (E-UTRAN) cell identifier (ECI) including a PCI and an eNB ID. For example, the identification information may include a business operator ID (e.g., a mobile network code (MNC) ID, a public land mobile network (PLMN) ID). According to an embodiment, the identification information may include an ECGI.

In operation 733, the base station may determine a specific resource area on an available resource area. According to various embodiments, the available resource area may be a specific band defined for V2X communication. For example, the specific band may be an ITS band of 5.9 GHz. The available resource area may include a time domain corresponding to a currently schedulable interval and a frequency domain enabling resource allocation by a corresponding base station on the ITS band.

The base station may determine a specific resource area on the available resource area. In some embodiments, the base station may determine a resource area specific to the base station in a time division multiplexing (TDM) manner. The base station may determine at least one time-frequency unit (e.g., a frame, a subframe, a slot, and a symbol)

dedicated to the base station. For example, the base station may specify a time interval corresponding to a first symbol and a second symbol among 14 symbols of one TTI (transmission time interval) on the basis of the identification information of the base station. An adjacent base station may specify a time interval corresponding to a third symbol and a fourth symbol on the basis of identification information of the adjacent base station.

In some embodiments, the base station may determine a resource area specific to the base station in a frequency division multiplexing (TDM) manner. The base station may determine at least one frequency resource unit (e.g., a bandwidth, a bandwidth part, a resource block (RB), a resource element (RE), and a subcarrier (SC)) dedicated to the base station. For example, the base station may identify 50 first resource blocks (RBs) among system bandwidths of the ITS band on the basis of the identification information of the base station. Another base station may identify other 50 second resource blocks on the basis of identification information of the other base station.

In some embodiments, the base station may determine a resource area specific to the base station in the time division multiplexing manner or the frequency division multiplexing manner. The base station may identify a zone that is specified with at least one-time resource unit and at least one frequency resource unit on the resource grid. The at least one-time resource unit and the at least one frequency resource unit may be specified by the identification information of the base station. For example, the base station may specify symbols by a first part (e.g., a cell group ID) constituting a cell identifier and may specify resource blocks by a second part (an ID in a cell group) constituting the cell identifier.

In some embodiments, the base station may determine a resource area specific to the base station in a designated pattern. Resources of the pattern designated to the base station may be orthogonal to resources of a pattern designated to another base station, on the resource grid. Locations of the resources according to the designated pattern may be acquired on the basis of the identified information. For example, the base station may identify a starting resource element (e.g., (k, 1), wherein k is a subcarrier number and 1 is a symbol number) defined on the resource grid obtained on the basis of an eNB ID value of the base station. The base station may determine, as the specific resource area, resource elements within a predetermined range from the starting resource element.

Examples of identifying or determining a specific resource area on the basis of configuration information and identification information are described with reference to FIGS. 7A and 7B, but the disclosure is not limited thereto. The base station may identify the specific resource area on the basis of not only the above-described information but also at least one of location information, driving information, or channel quality of the vehicle apparatus. According to various embodiments, the base station may determine the specific resource area on the basis of a size determined according to a channel quality. For example, the base station may determine the specific resource area such that the size of the specific resource area is small as the channel quality is low. The base station may determine the specific resource area such that the size of the specific resource area is large as the channel quality is high. By configuring the size of the specific resource area in inverse proportion to the size of the channel quality, the coexistence between base stations adjacent on the entire resource grid may be satisfied. According to various embodiments of the disclosure, a probability of collision when messages are transmitted between two vehicle apparatuses may be reduced by configuring a resource area of a transmission resource for V2X communication to be different from a resource area of a neighboring base station.

Figure 8:
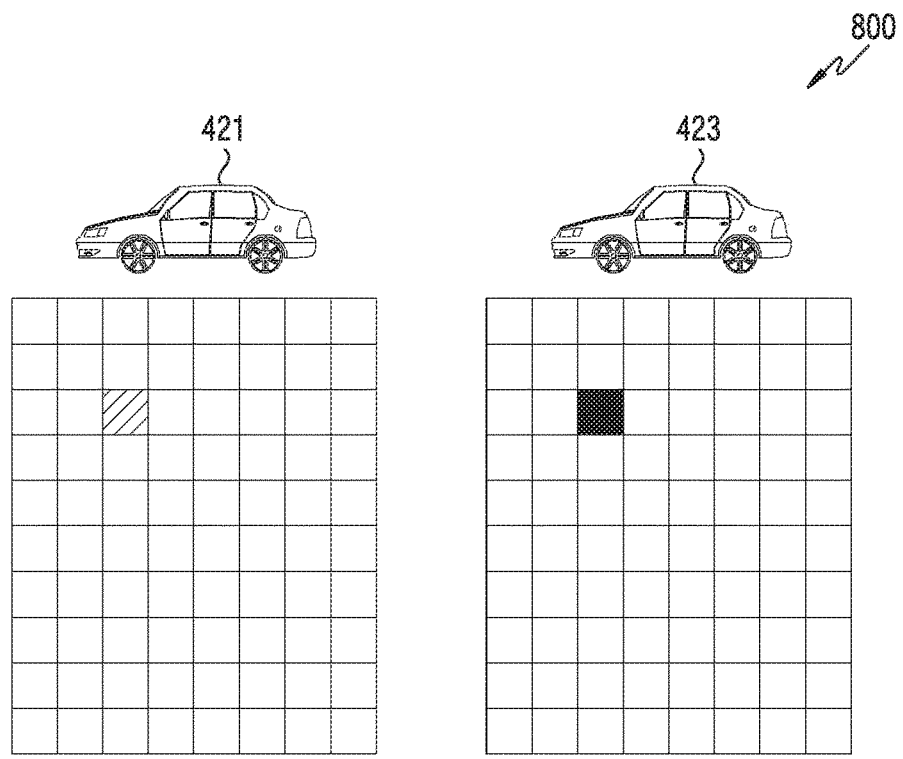
FIG. 8 illustrates an example of location-based resource allocation in a wireless communication system according to an embodiment of the disclosure.
Figure 8:
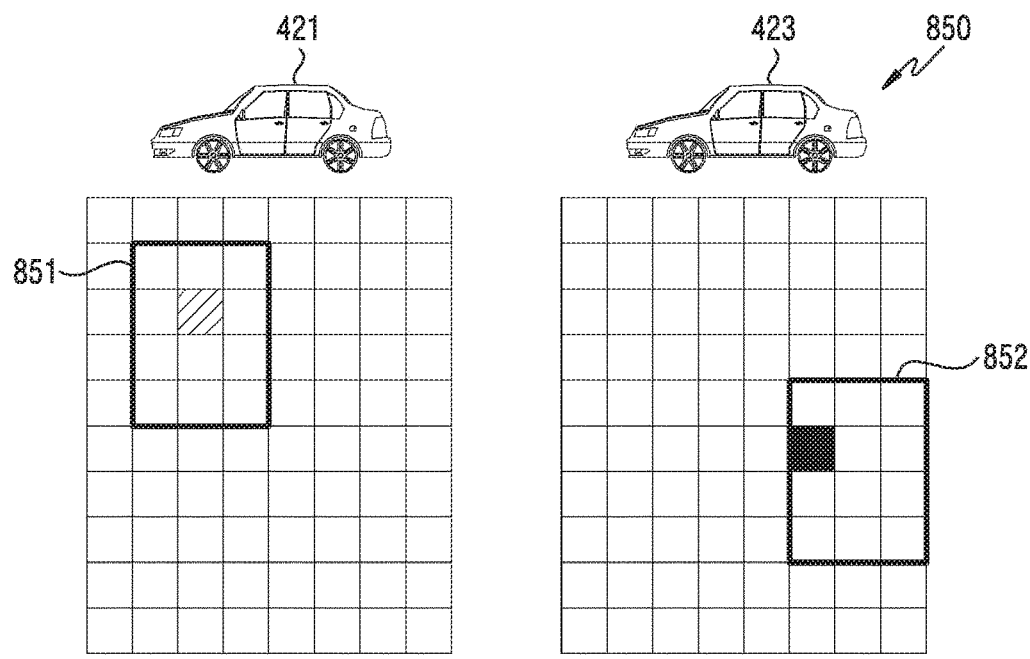

FIG. 8 illustrates an example of location-based resource allocation in a wireless communication system according to an embodiment of the disclosure. The base station according to various embodiments may differently configure a resource area, that is a set of allocable resources, on the basis of a location of a vehicle. Base stations of FIG. 8 illustrate the first base station 111 or the second base station 112 of FIG. 1, 2, or 4. A vehicle apparatus illustrates the terminals 121 to 129 of FIGS. 1 and 3, or the first vehicle apparatus 421 or the second vehicle apparatus 423 of FIG. 4.

Referring to FIG. 8, the first base station may determine a resource area for the first vehicle apparatus. The second base station may determine a resource area for the second vehicle apparatus. The first vehicle apparatus may be located at the cell center of the first base station. The first base station may determine the resource area on a resource grid 800. The resource area may be available not only to the first base station but also to the first base station and another base station. The resource area may be a set of resources that are not dedicated to a specific base station. The first base station may determine a common resource area on the resource grid 800. According to an embodiment, the first base station may configure the common resource area. The first base station may transmit, to the first vehicle apparatus, information indicating the configured common resource area. Likewise, the second vehicle apparatus may be located at the cell center of the second base station. The second base station may determine a resource area on the resource grid 800. The resource area may be available not only to the second base station but also to the second base station and another base station. The second base station may determine a common resource area on the resource grid 800. According to an embodiment, the second base station may configure a second common resource area. Each of the first base station and the second base station may independently perform scheduling. Because the first vehicle apparatus is located at the cell center of the first base station and the second vehicle apparatus is located at the cell center of the second base station, even if the same transmission resource is allocated to the first vehicle apparatus and the second vehicle apparatus, a collision may not occur. Even if the first vehicle apparatus and the second vehicle apparatus transmit messages at the same time, a collision may not occur due to the physical distance difference between the two messages.

The first vehicle apparatus may also be located outside the cell of the first base station. The first base station may determine a first specific resource area 851 on a resource grid 850. The first base station may determine the first specific resource area 851 that does not overlap a second specific resource area 852 on the same resource grid. According to an embodiment, the first base station may configure the first specific resource area 851. The second vehicle apparatus may be located outside the cell of the second base station. The second base station may configure the second specific resource area 852 on the resource grid 850. The second base station may determine the second specific resource area 852 that does not overlap the first specific resource area 851 on the same resource grid. According to an embodiment, the second base station may configure the second specific resource area. When scheduling a terminal (a vehicle apparatus) located at a cell edge, the first base station or the second base station may prevent resource allocation at the same location by differently configuring a resource area for each base station. Each of the first base station and the second base station may independently perform scheduling. Even if each of the first base station and the second base station independently performs scheduling, different transmission resources may be allocated to the first vehicle apparatus and the second vehicle apparatus, respectively, by configuring an area available for resource allocation in a base station-specific manner.

According to various embodiments of the disclosure, an operation method of a base station in a wireless communication system may include acquiring a channel quality of a first vehicle apparatus, determining a resource allocation area of the first vehicle apparatus according to the channel quality and transmitting, to the first vehicle apparatus, allocation information relating to a transmission resource determined in the resource allocation area, wherein the transmission resource is used by the first vehicle apparatus to transmit a message to a second vehicle apparatus.

According to various embodiments, the determining of the resource allocation area may include determining whether the first vehicle apparatus satisfies a specific condition on the basis of the channel quality and when the specific condition is not satisfied, determining a common resource area as the resource allocation area, and when the specific condition is satisfied, determining the specific resource area as the resource allocation area, wherein the common resource area includes resources available to the base station and at least one other base station different from the base station and the specific resource area is resources dedicated to the base station.

According to various embodiments, the determining of the specific resource area as the resource allocation area may include acquiring identification information of the base station and determining the specific resource area in all available resource areas on the basis of the identification information, wherein the all available resource areas include the common resource area.

According to various embodiments, the specific resource area may be identified among a plurality of resource areas, the plurality of resource areas may correspond to different base stations, respectively, and the plurality of resource areas may be areas that do not overlap each other on a time-frequency resource grid.

According to various embodiments, the determining of whether the first vehicle apparatus satisfies the specific condition may include acquiring a first channel quality for a serving cell of the base station of the first vehicle apparatus and when the first channel quality exceeds a threshold value, determining that the specific condition is not satisfied, and when the first channel quality is equal to or below the threshold value, determining that the specific condition is satisfied.

According to various embodiments, the determining of whether the first vehicle apparatus satisfies the specific condition may include acquiring a first channel quality for a serving cell of the base station of the first vehicle apparatus, acquiring a second channel quality for a cell of another base station of the first vehicle apparatus and when a value obtained by subtracting the first channel quality from the second channel quality is equal to or smaller than a threshold value, determining that the specific condition is not satisfied, and when a difference between the first channel quality and the second channel quality exceeds the threshold value, determining that the specific condition is satisfied.

According to various embodiments, the acquiring of the channel quality may include receiving a measurement report from the first vehicle apparatus, wherein the measurement report includes at least one of a reception signal intensity for a reference signal transmitted from the base station or a reception signal intensity for a reference signal transmitted from another base station.

According to various embodiments, the operation method may further include transmitting, to the vehicle apparatus, a configuration message including information relating to the determined resource area, wherein the transmission resource may be a resource allocated for a PC5 communication interface, the allocation information may be included in sidelink control information (SCI) so as to be transmitted, the SCI may be included in downlink control information (DCI) so as to be transmitted, and the message may be transmitted by radio resource control (RRC) signaling.

The base station may reduce a probability of collision between transmission messages of the vehicle apparatus when configuring a specific resource area unique to the base station and selecting a resource by the base station. Various embodiments of the disclosure provide a method for further reducing a collision probability on the basis of energy sensing by a terminal in addition to a resource area configuration by a base station. Hereinafter, embodiments of a sensing-based resource selection will be described with reference to FIGS. 9 and 10.

Figure 9:
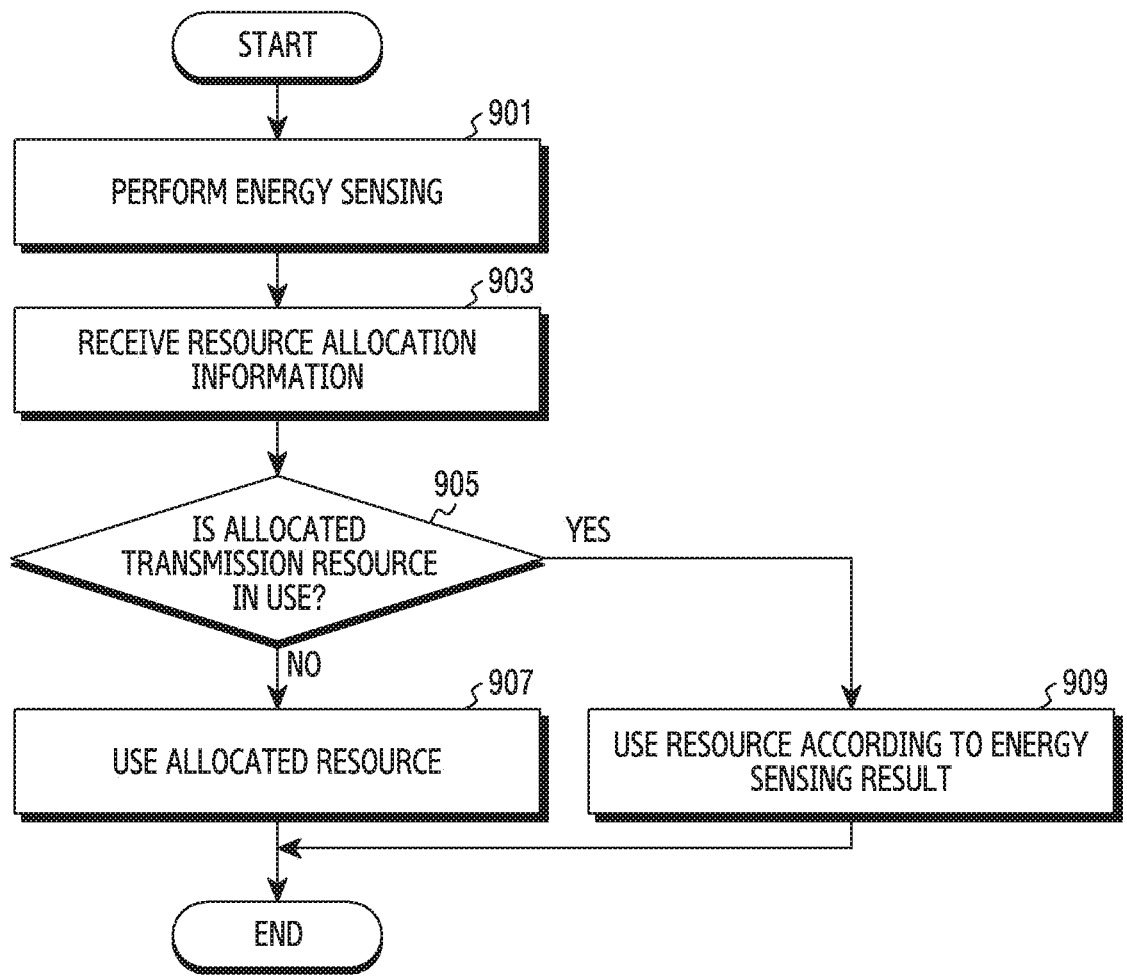
FIG. 9 illustrates a flowchart of operations of a vehicle apparatus that performs energy sensing-based resource selection in a wireless communication system according to an embodiment of the disclosure.

FIG. 9 illustrates a flowchart of operations of a vehicle apparatus for sensing-based resource selection in a wireless communication system according to an embodiment of the disclosure. A vehicle apparatus of FIG. 9 illustrates the terminals 121 to 129 of FIGS. 1 and 3, or the first vehicle apparatus 421 or the second vehicle apparatus 423 of FIG. 4.

Referring to FIG. 9, in operation 901, a vehicle apparatus may perform energy sensing. Energy sensing is a procedure for determining which channel is being used in the vicinity, and the vehicle apparatus may determine whether a corresponding channel is in use by another vehicle apparatus, on the basis of whether a signal intensity equal to or greater a threshold value is detected in the channel.

According to various embodiments, when it is determined that the vehicle apparatus is located at a cell edge, the vehicle apparatus may initiate energy sensing in operation 901. In order to determine whether the vehicle apparatus is located at the cell edge, the vehicle apparatus may measure a channel quality of a reference signal or synchronization signal received from a base station, or may obtain location information of the vehicle apparatus through a GNSS communication module. For example, the vehicle apparatus may determine whether the vehicle apparatus is located at the cell edge of a serving base station according to whether an average of RSRP values of reference signals received from the serving base station exceeds a threshold value. According to various embodiments, the vehicle apparatus may initiate energy sensing without determining a location in a cell according to the channel quality of the vehicle device. This is because, when the vehicle apparatus is located at the cell center, a transmission resource received from the base station is already an available resource determined by the base station.

The vehicle apparatus may receive configuration information relating to energy sensing from the base station. The configuration information relating to energy sensing may include information relating to at least one of a sensing window, a sensing periodicity, and a resource selection window. The vehicle apparatus may determine whether a signal by another node (a vehicle apparatus or a base station) having an intensity equal to or greater than a threshold value is detected in a resource area during the sensing window. If a signal having an intensity equal to or greater than a threshold value is detected in a specific resource, the vehicle apparatus may determine that the resource is occupied by another node (a vehicle apparatus or a base station). That is, it may be determined that the resource is being used by another node, according to a result of energy sensing.

In operation 903, the vehicle apparatus may receive resource allocation information. The resource allocation information may include information indicating a resource selected within the resource area by the base station. For example, the resource allocation information may be SCI included in DCI. The resource allocation information may be information relating to the transmission resource used when the vehicle apparatus transmits a message to another vehicle apparatus. The vehicle apparatus may identify the transmission resource allocated for V2X communication (e.g., V2V communication) by receiving the resource allocation information from the base station.

In operation 905, the vehicle apparatus may determine whether the allocated transmission resource is in use. The vehicle apparatus may determine whether an available channel acquired via the energy sensing in operation 901 includes the allocated transmission resource. The vehicle apparatus may determine whether the available channel, i.e., a channel that is not being used by another node, includes the transmission resource. When the available channel includes the allocated transmission resource, the vehicle apparatus may determine that the allocated transmission resource is not being used by another node. When the available channel does not include the allocated transmission resource, the vehicle apparatus may determine that the allocated transmission resource is being used by another node. The vehicle apparatus may perform operation 907 when it is determined that the allocated transmission resource is not being used by another node. The vehicle apparatus may perform operation 909 when it is determined that the allocated transmission resource is being used by another node.

In operation 907, the vehicle apparatus may use the allocated resource. The vehicle apparatus may use the allocated transmission resource for message transmission of the vehicle apparatus. The vehicle apparatus may transmit a message (e.g., BSM) on the transmission resource, on the basis of sidelink control Information acquired on the basis of downlink control information. That is, the vehicle apparatus may transmit a message by using a transmission resource selected by the base station. For example, in an LTE communication system, the base station and the vehicle apparatus use a resource allocation scheme, such as mode 3.

In operation 909, the vehicle apparatus may use a resource according to an energy sensing result. The vehicle apparatus may identify a transmission resource on the basis of the energy sensing result. The energy sensing result may include available channels that are not used by another node. Since the vehicle apparatus detects that the resource allocated from the base station is used by another node (e.g., a vehicle apparatus), the vehicle apparatus may identify the transmission resource among the available channels. The vehicle apparatus may not use the resource allocated from the base station. According to an embodiment, the vehicle apparatus may discard the resource allocated from the base station. The vehicle apparatus may transmit the message (e.g., BSM) by using the identified transmission resource.

In FIG. 9, it is described that operation 903 is performed after operation 901, but the disclosure is not limited thereto. For example, the vehicle apparatus may perform energy sensing after receiving the resource allocation information according to operation 903. The vehicle apparatus may determine whether the allocated transmission resource is in use, by performing energy sensing for a sub-channel corresponding to the resource allocation information.

Figure 10:
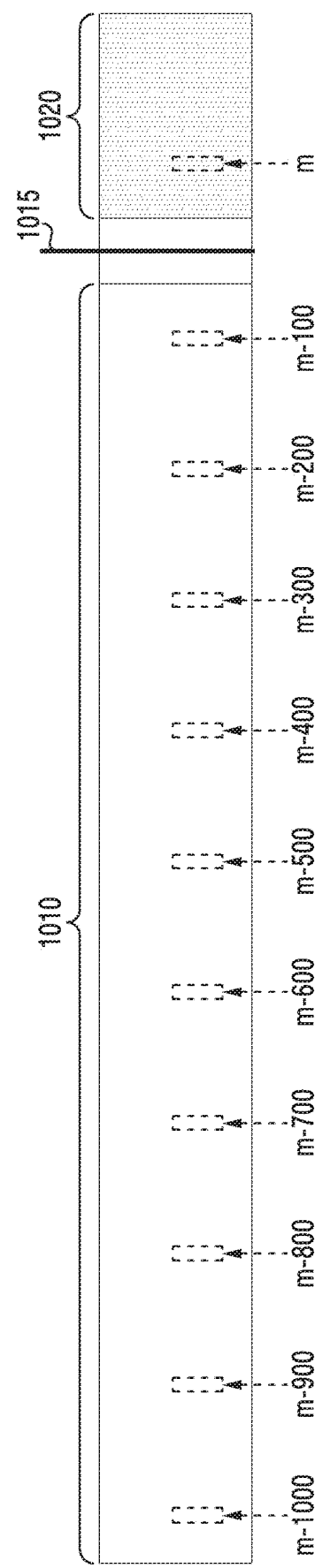
FIG. 10 illustrates an example of energy sensing-based resource selection in a wireless communication system according to an embodiment of the disclosure.

FIG. 10 illustrates an example of energy sensing-based resource selection in a wireless communication system according to an embodiment of the disclosure. Energy sensing is a procedure performed by a vehicle apparatus, and illustrates operation 901 of FIG. 9. The vehicle apparatus may sense whether a message of another vehicle apparatus is transmitted.

Referring to FIG. 10, an energy sensing window 1010 may be configured in the vehicle apparatus. For example, a length of the energy sensing window 1010 may be 1000 ms. The vehicle apparatus may sense whether transmission by another vehicle apparatus is performed. The vehicle apparatus may sense transmission by another vehicle apparatus in each reception subframe during the energy sensing window 1010.

The vehicle apparatus may generate energy sensing results for 1000 subframes by performing energy sensing during the energy sensing window 1010. The energy sensing results may include available candidate resources. The vehicle apparatus may determine candidate resources by excluding a resource corresponding to a case in which SCI of another vehicle apparatus is predicted and an average signal intensity is equal to or greater than a threshold value, from among resources for V2X communication (e.g., V2V communication).

According to various embodiments, the vehicle apparatus may determine whether a resource allocated from the base station is present among the candidate resources. The resource allocated from the base station may refer to a V2X transmission resource indicated by SA included in DCI. When the V2X transmission resource is included in the candidate resources, the vehicle apparatus may determine that the transmission resource is not occupied by another vehicle apparatus. Accordingly, the vehicle apparatus may transmit a message to another vehicle apparatus by using the transmission resource.

According to various embodiments, when the V2X transmission resource is not included in the candidate resources, the vehicle apparatus may determine that the transmission resource is being used by another vehicle apparatus. The vehicle apparatus may determine the transmission resource on the basis of the energy sensing result during the energy sensing window 1010. After 1000 subframes, the vehicle apparatus may perform resource selection in subframe 1015. The vehicle apparatus may perform resource selection in a resource selection window 1020. The vehicle apparatus may select an available transmission resource among the candidate resources. The vehicle apparatus may reserve a selected resource during the resource selection window 1020. The vehicle apparatus may select and reserve repeated resources from selected resources according to a configured period. The vehicle apparatus may transmit a message to another vehicle apparatus by using the selected and reserved resources.

According to various embodiments of the disclosure, an operation method of a vehicle apparatus in a wireless communication system may include performing energy sensing, receiving resource allocation information relating to a transmission resource, determining whether the transmission resource is being used by another node on the basis of the energy sensing and when the transmission resource is being used by the other node, transmitting a message to another vehicle apparatus on an available channel acquired by the energy sensing, and when the transmission resource is not being used by the other node, transmitting a message to another vehicle apparatus on the transmission resource.

According to various embodiments, the performing of energy sensing may include performing the energy sensing when a channel quality for a serving cell of the vehicle apparatus exceeds a threshold value, wherein the channel quality includes a reference signal received power (RSRP).

In the disclosure, the expression "equal to or greater than" or "equal to or below/smaller than" is used to determine whether a specific condition is satisfied (fulfilled), but this is merely a description to represent an example and does not exclude "exceeding" or "below/smaller than". The description of conditions "equal to greater than" may be replaced with "exceeding", the description of conditions "equal to or below/smaller than" may be replaced with "below/smaller than", and the description of conditions "equal to or greater than and below/smaller than" may be replaced with "exceeding and equal to or below/smaller than".

Further, in the disclosure, mode 3 and mode 4, which are V2X modes in LTE, are described as examples, but the disclosure may be applicable, in the same or similar scheme, to other communication systems (e.g., NR) in addition to the LTE when scheduling is performed in a mode defined according to a resource allocation scheme.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access a device that performs an embodiment of the disclosure via an external port. Further, a separate storage device on the communication network may access a portable electronic device.

Further, either multiple elements expressed in the description may be configured into a single element or a single element in the description may be configured into multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first vehicle apparatus in a wireless communication system, the method comprising:
receiving, from a base station, configuration information on a resource pool to the base station;
identifying whether the first vehicle apparatus is located at an edge of a serving cell based on information on a channel quality between the first vehicle and the base station;
in case that the first vehicle apparatus is located at the edge of the serving cell, obtaining one or more available subchannels by performing an energy sensing;
receiving, from the base station, downlink control information (DCI) resource allocation information indicating resources allocated in the resource pool;
identifying whether one or more available subchannels includes the allocated resources;
in case that the one or more available subchannels do not include the allocated resources, transmitting a message to a second vehicle apparatus on an available subchannel of the one or more available subchannels; and
in case that the one or more available subchannels include the allocated resources, transmitting a message to the second vehicle apparatus on the allocated resources.

2. The method of claim 1, wherein the performing of the energy sensing comprises:
performing the energy sensing in case that a channel quality for a serving cell of the vehicle apparatus exceeds a threshold value,
wherein the channel quality comprises a reference signal received power (RSRP).

3. The method of claim 1, wherein configuration information on a resource pool to the base station includes information of at least one of a sensing window, a sensing periodicity, or a resource selection window.

4. The method of claim 1, wherein the performing the energy sensing comprising:
sensing a transmission by another vehicle apparatus based on the configuration information on a resource pool to the base station;
performing the energy sensing during an energy sensing window; and
obtaining one or more available subchannels.

5. The method of claim 4, wherein the performing the energy sensing during the energy sensing window comprising:
identifying that an at least one of subchannels are being used by the second vehicle apparatus in case that a signal having an intensity equal to or greater that a threshold value is detected in the at least one of subchannels.

6. The method of claim 1, further comprising:
in case that the one or more available subchannels do not include the allocated resources, discarding the allocated resources.

7. A first vehicle apparatus in a wireless communication system, the vehicle apparatus comprising:
at least one transceiver; and
at least one processor operatively coupled to the at least one transceiver,
wherein the at least one processor is configured to:
receive, from a base station, configuration information on a resource pool to the base station, identify whether the first vehicle apparatus is located at an edge of a serving cell based on information on a channel quality between the first vehicle and the base station, in case that the first vehicle apparatus is located at the edge of the serving cell, obtain one or more available subchannels by performing an energy sensing, receive, from the base station, downlink control information (DCI) resource allocation information indicating resources allocated in the resource pool, identify whether one or more available subchannels includes the allocated resources, in case that the one or more available subchannels do not include the allocated resources, transmit a message to a second vehicle apparatus an available subchannel of the one or more available subchannels, and in case that the one or more available subchannels include the allocated resources, transmit a message to the second vehicle apparatus on the allocated resources.

8. The first vehicle apparatus of claim 7, wherein, in order to perform the energy sensing, the at least one processor is further configured to perform the energy sensing in case that a channel quality for a serving cell of the vehicle apparatus exceeds a threshold value, wherein the channel quality comprises a reference signal received power (RSRP).

9. The first vehicle apparatus of claim 7, wherein configuration information on a resource pool to the base station includes information of at least one of a sensing window, a sensing periodicity, or a resource selection window.

10. The first vehicle apparatus of claim 7, the at least one processor is further configured to:

sense a transmission by another vehicle apparatus based on the configuration information on a resource pool to the base station;

perform the energy sensing during an energy sensing window; and obtain one or more available subchannels.

11. The first vehicle apparatus of claim 10, wherein the at least one processor is further configured to:

identify that an at least one of subchannels are being used by the second vehicle apparatus in case that a signal having an intensity equal to or greater that a threshold value is detected in the at least one of subchannels.

12. The first vehicle apparatus of claim 10, wherein the at least one processor is further configured to:

in case that the one or more available subchannels do not include the allocated resources, discard the allocated resources.

* * * * *